Wilhelm Kaiser & Hans Balke
INVENTORS

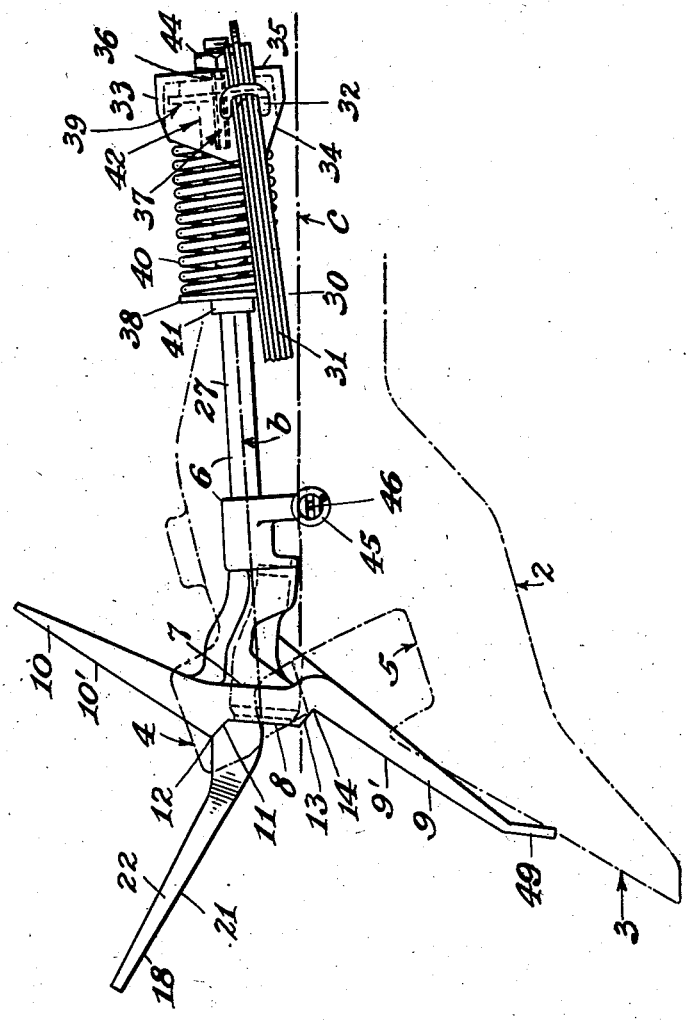

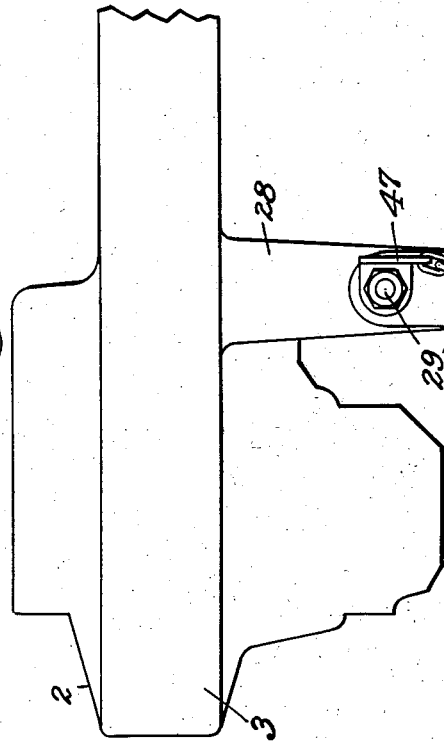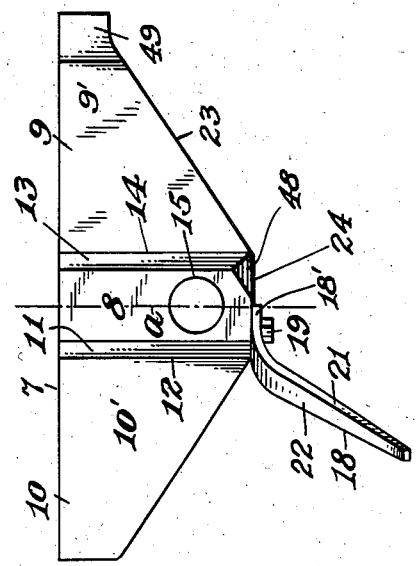

BY Haseltine, Lake & Co.
ATTORNEYS

Patented May 28, 1935

2,003,082

UNITED STATES PATENT OFFICE 2,003,082

AUTOMATIC COUPLING FOR PIPE LINES, ELECTRIC LINES ON RAILWAY AND OTHER VEHICLES AND THE LIKE

Wilhelm Kaiser and Hans Balke, Lichtenberg, Berlin, Germany, assignors to National Malleable and Steel Castings Company, Cleveland, Ohio, a corporation of Ohio Application March 4, 1935, Serial No. 9,156
In Germany September 2, 1933

7 Claims. (Cl. 285—58)

This invention relates to automatic train line connectors. One of its objects comprises the provision of connectors of novel construction, presenting the advantage of structural simplicity together with marked efficiency and reliability in the connecting of train lines notwithstanding disalignment of the longitudinal axes of the connectors throughout wide ranges. In this connection, a feature of the invention resides in a connector having guiding surfaces so constructed and arranged as to provide a facile and effective gathering action with an opposing connector, under widely varying extents of relative lateral and vertical displacement. The invention further provides for so mounting the connectors with respect to their associated couplers as to facilitate the gathering action and also to enable reduction of the extent of forward projection of the lateral forward wing. A novel and improved means for supporting the connectors is also provided. In addition the invention comprises novel means for securely maintaining the connector heads in properly coupled relation after coupling. Other features of the invention will be hereinafter described and claimed.

In the accompanying drawings:

Figure 1 is a top plan view showing a connector embodying our invention, in conjunction with an associated coupler shown in broken lines, and part of the connector mounting being shown fragmentarily and other parts omitted.

Figure 2 is a view in side elevation showing the connector, the associated coupler, and the means for supporting said connector from said coupler.

Figure 3 is a front elevational view of the connector.

Figure 4:
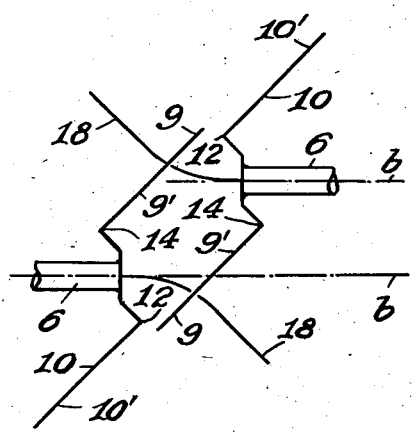

Figures 4-7, inclusive, are diagrammatic views illustrating the coupling action of the connectors under various conditions of disalignment.

Referring to the drawings, there is shown at 2 a coupler of the conventional Willison type, having rigid jaws 3, 4, together with a recess 5 intermediate said jaws. The action of such couplers being well understood in the art, no description thereof need here be given. It may be further observed that while the present invention is shown in conjunction with couplers of the Willison type, such is merely for purposes of illustration, and the utility of the invention is not restricted to couplers of any particular type. The connector, designated generally as 6, is supported from coupler 2 by means later to be more specifically described.

The connector 6 comprises a head 7 having a flat, vertically extending, front face 8, preferably, though not necessarily, rectangular in shape. The vertical center line $a$ of said face 8 intersects the longitudinal center line $b$ of the connector. Projecting from said head 7 on opposite sides of the face 8, are a pair of arms or wings 9, 10; the wing 9 extending diagonally forwardly, and the wing 10 diagonally rearwardly. Extending diagonally forwardly from one side of the face 8 is a surface 11, which meets the outer or forward surface 10' of the wing 10 and forms therewith a projection or ridge 12. From the opposite side of said face there extends diagonally rearwardly or inwardly a surface 13 which merges with the forward surface 9' of the wing 9, at a distance from the center line $a$ of the face 8 equal to the distance of the juncture of surfaces 11 and 10' from said center line. Said surface 13 forms with the surface 9' a recess 14 complemental to said ridge 12 and adapted to receive the ridge or corner 12 of an opposing connector at the same time that the first mentioned ridge 12 fits into the recess 14 of said opposing connector. While the face 8 may contain any desired number of openings corresponding to the number of pipes or lines to be joined, such as the air brake line, the signal air, and the steam heating line, only one opening 15 is shown by way of illustration for communicating with the air brake line.

A third wing or arm 18 projects diagonally downwardly, forwardly, and laterally from the bottom of the face 8. Said arm may conveniently be formed separately from the connector and secured to the bottom of the head 7 by bolts 19 passing through an extension 18' of said arm (Fig. 2), or by welding or in any other suitable manner.

Figure 4 illustrates how opposing connectors 6, 6 are gathered or brought into interconnected position, despite pronounced lateral separation of their longitudinal axes $b$, $b$. It will be noted from this view that as one connector approaches the other, the wing 10 of one engages wing 9 of the other, and wing 9 of the first the wing 10 of the other, with consequent bringing of the connectors into proper mating position, with their axes $b$, $b$ in alignment and ridge 12 of each fitting into recess 14 of the other. It may be noted in this connection that the surfaces 9', 10' of the wings of each connector are parallel to each other.

Figure 5:
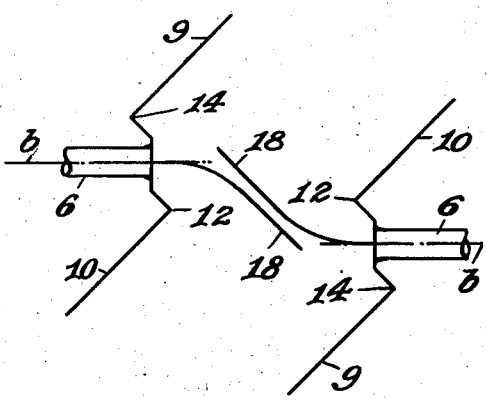

In Figure 4 the direction of lateral displacement of the connectors is such that the arms 18 have been carried laterally away from each other. Figure 5 illustrates the gathering action when the lateral displacement is in the opposite direction from that shown in Figure 4, i. e., with center line *b* of one connector on the opposite side of center line *b* of the other connector from that shown in Figure 4. Under these conditions, as one connector approaches the other the laterally off-set side surface 21 of one arm 18 engages the corresponding surface 21 of the other, whereby as the relative approach of the connectors continues, said connectors are restored into proper alignment and are caused to intermesh properly.

Figure 6:
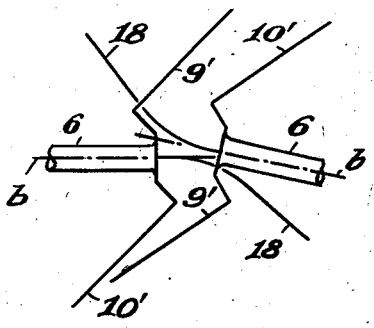

Figure 6 shows how the longitudinal axes *b*, *b* of the opposing connectors are brought into alignment by the intercepting surfaces 9', 10', when said axes are at an angle to each other. The surface 9' of one connector lying on the inner side of the obtuse angle formed by the axes *b*, *b*, is brought against the surface 10' of the other connector as one approaches the other whereby as the approaching movement continues the connectors are caused to pivot with respect to each other, and their axes *b*, *b* are straightened or restored into alignment. Should the connectors be angled in the opposite direction, it will be evident that the opposite surfaces 10', 9' will coact in the same manner as those which engage each other under the conditions shown in Figure 4, with resultant straightening of the axes *b*, *b*.

Figure 7:
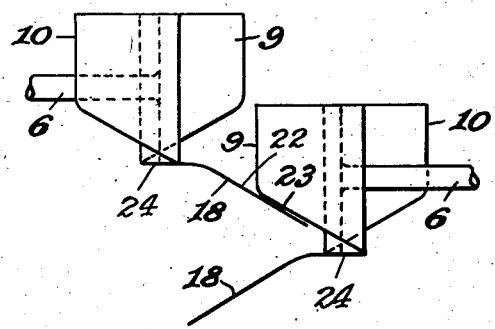

In Figure 7 the connectors are shown displaced vertically. It will be seen that as one approaches the other the upper surface 22 of the vertical arm 18 of one will, in cooperation with the under surface 23 of projection 9 of the other, cause the two connectors to be restored vertically into proper relation to each other. It will be noted that the lower surface 23 of the wing 9 of each connector extends diagonally upwardly and outwardly from the bottom surface 24 of the face 8 to a point adjacent the end of said wing. Through the cooperation of the top surface 22 of the vertical arm 18 of one connector with lower surface 23 of wing 9 of the other, the two connectors are brought into proper vertical alignment in any of their positions of lateral displacement within the lateral gathering range of said wing 9. In the final stage of the movement of the connectors into vertical alignment, said surface 22 of arm 18 on one connector engages the bottom surface 24 of face 8 of the other. The inclination of the edge 23 and the relative rise of arm 18 determine the vertical gathering range. If, in addition to being vertically disaligned, the connectors are displaced laterally in the direction indicated in Figure 5, with their respective arms 18 in engageable relation, the side surface 21 of one of said arms, in cooperation with the corresponding surface 21 of the other, causes the connectors to approach each other vertically as well as laterally, while the final vertical alignment is accomplished through the coaction of upper surface 22 of one arm 18 with bottom surface 24 of the other connector.

From the above description it will be seen that the vertical gathering surface 23 (together with the lowermost surface 24 of the face 8) and the surfaces 21 and 22 of the lower wing 18 form, in effect, a continuous guiding or gathering surface devoid of interruptions or projections. The effect of this is that any part of wing 18 may contact any part of surface 23 or 24 or the wing 18 of an opposing connector and move along those surfaces or the opposing wing to bring the two connectors into vertical and lateral alignment. The primary purpose of the rearwardly extending wing 10 is to effect angular alignment of the connectors, as shown in Figure 6.

The upward slope of surface 23 is highly advantageous in that the vertical gathering range is increased without increasing the overall height of the connector and said surface 23 may extend upwardly above the horizontal center of the connector head, or may extend substantially to the top edge of the connector if the maximum vertical gathering range is desired. It has been found that a large vertical gathering range is required on certain types of cars and that on these cars overall vertical extent of the connector is limited. It is apparent therefore that our invention utilizes practically all of the vertical extent of the connector for vertical gathering.

Fitted into a socket in the connector head 7 and secured thereto in any suitable manner, as by pin 26, is a rod 27 which extends rearwardly from said head. A lug 28 depending from the coupler 2 has secured thereto by bolts 29 a bracket 30, preferably comprising a set of leaf spring elements 31, extending rearwardly and downwardly from the lug 28. Fastened to the rear end of the leaf spring bracket 30, through a U-bolt 32 is an angle bracket 33, comprising a plate having horizontal and vertical portions 34, 35. A vertical slot 36 in the bracket portion 35 receives vertical keys 37, 37, carried by the rod 27, whereby said rod, and hence the connector, is slidable longitudinally with respect to the bracket 33. The slot 36 provides sufficient clearance with respect to the keys 37, 37, to enable the connector to angle through substantial extents in all directions, both vertically and horizontally, with respect to said bracket; but at the same time prevents rotation of the connector more than a slight amount about its longitudinal axis.

Interposed between washers 38, 39 on rod 27 is a spring 40, which not only assists in supporting the connector but also is compressed whenever the connector is coupled to a mating connector and thereby maintains the connectors in tightly coupled relation. The washer 38 bears against a collar 41 pinned or otherwise secured to the rod 27, while the washer 39 is integral with, or fastened to, a sleeve 42 slidable on said rod. Said washer 39 bears against suitable lugs 43 which project forwardly from the bracket portion 35 and provide pivot seats about which the rod 27 and assembled parts may turn for vertical and horizontal angling. The sleeve 42 and washer 39 are slotted to receive the vertical keys 37, 37 to permit said rod 27 to slide freely with respect to said sleeve and washer. Threaded on the end of the rod 28 is a nut 44 which is adapted to engage the rear face of the bracket portion 35 and to thereby retain the connector in position on the bracket 33.

The connector is additionally resiliently supported from the associated coupler 2 by a spring 45, secured at one end to a bolt 46 on the connector head and at its other end to a lug 47 extending laterally from the supporting lug 28. Through the provision of the spring 45, the spring 40 may be substantially reduced in stiffness, so as to avoid difficulty in coupling the connectors at slow speeds or with light cars.

As shown in Figure 1, the bracket 30 diverges laterally and rearwardly from the longitudinal center line c of the coupler 2; and the connector is so supported through its springs and the bracket 33 that in the normal position of said connector its longitudinal axis b extends at an angle to the axis c of the coupler. Furthermore, in normal position, the center line b at the face of the connector is laterally off-set a less amount from coupler center line c than is said center line b at the bracket 33. The connector center line, in other words, in the normal position of the connector, diverges rearwardly with respect to the coupler center line, from a point on the face of the connector to the rear supporting bracket 33; both the connector face and said supporting bracket being displaced to one side of the coupler center line, and the lateral displacement of the slots 36 of said bracket from said coupler center line being greater than that of the center of the connector face from said coupler center line. This enables the lateral gathering by the connector wing 9 to be accomplished with increased facility, since the arm of the turning moment (i. e., the perpendicular distance from the vertical pivotal axis of the connector in bracket 33 to the line of action of the force applied to said wing 9) is increased. Thereby also the extent of forward projection of the wing 9 may be reduced, due to said increase in moment arm.

It is to be noted further that the construction above described enables the wings 9 and 10 to be of prolonged extent laterally, with the extremities of said wings at all times outside a direct line between the points on brackets 35 at which the connector rods 27 pivot. As a result, contact between the extremities of the wings of opposing connectors will serve to bring the same into horizontal alignment without danger of "jack knifing" or swinging of the connectors into positions transverse to the couplers, with their heads out of alignment.

Also, due to the small ratio of extent of forward projection of the wings to the distance from the connector face 8 to the rear bracket portion 35, the vertical gathering of the connectors is insured without buckling upwardly or downwardly.

The point of attachment of the spring 45 to the connector head is, as shown in Figure 1, at one side of the connector axis b, as a result of which the connector is, when uncoupled, titled slightly around said axis to the extent permitted by the fins 37, 37 in cooperation with the sides of the slot 36. When coupling is effected the connector head is rotated back about said axis into a horizontal position. Due to the off-set connection aforesaid between the spring 45 and the connector, the connector head is normally maintained in a definite position about the axis b and it is assured that the ridge 12 of the connector will contact the guiding face 9' of the opposing connector whereby there is avoided the possibility that the ridges 12 of opposing connectors might foul and prevent coupling, as might arise if either of the connector heads were free to rotate in opposite directions about its longitudinal axis. It may be observed that the ridges aforesaid need not extend the full height of the connector face 8. The face 8 of the connector may be slightly cut away as indicated at 48 in the lower right hand corner to prevent accumulation of foreign material on the connector face from interfering with proper engagement with the face of an opposing connector.

As shown at 49, the forwardly extending lateral wing 9 may be provided with an outer extension, the face of which is substantially parallel to the face 8 of the connector. The aforesaid extension 49 further increases the lateral gathering range.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

This application is a continuation in part of our U. S. application S. N. 757,474, filed December 14, 1934.

We claim:

1. An automatic train line connector comprising a front face, a wing extending laterally and forwardly from said face and having a lower guiding edge extending upwardly and outwardly from the lower extremity of said face, a second wing extending downwardly and forwardly from the lower edge of said front face and also extending therefrom in a lateral direction opposite to that of the first named wing, a guiding edge of said second wing and the lower guiding edge of the first named wing forming portions of a continuous guiding surface so arranged that upon engagement of the guiding edge of either the first or the second named wing by the second named wing of an opposing connector the latter wing is adapted to move along said guiding surface to the juncture between said guiding edges of said wings for aligning said connectors vertically and laterally.

2. An automatic train line connector comprising a front face, a guiding wing extending laterally and forwardly from said face and having a lower guiding edge extending upwardly and outwardly, and a wing extending forwardly, downwardly and laterally from the lowermost extremity of said front face and adapted to engage either the lower edge of the first named wing of an opposing connector to move said connectors into vertical alignment or the second named wing of said opposing connector for lateral alignment.

3. An automatic train line connector comprising a front face, guiding wings extending laterally from opposite sides of said face, one of said wings inclined forwardly and the other rearwardly of said face, the lower edge of the forwardly projecting wing forming a guiding surface and extending outwardly and upwardly, and a third wing inclined forwardly, downwardly and laterally from the lowermost extremity of said face and adapted to engage the lower edge of the forwardly extending lateral wing of an opposing connector to move said connectors into vertical alignment, the first and second named wings being adapted to cooperate with complementary wings on an opposing connector for aligning said connectors laterally.

4. An automatic train line connector comprising a front face, diagonally extending lateral wings having vertical front surfaces, one of said wings having its lower edge extending outwardly and upwardly, said front surfaces of said wings being adapted to cooperate with complementary surfaces on an opposing connector for aligning said connectors only in a lateral direction and maintaining lateral stability of said connectors, each of said connectors having a forwardly and downwardly extending guiding member joining said front face at its lower extremity, said guiding member cooperating with the lower edge of a wing of an opposing connector for securing vertical alignment and with a corresponding guiding element on said opposing connector for lateral alignment.

5. An automatic connector comprising a front face extending vertically with respect to the longitudinal axis of said connector, a wing extending laterally and rearwardly from one side of said face, another wing extending laterally and forwardly from the opposite side of said face, said wings being adapted to cooperate with complemental wings on a second connector for effecting lateral alignment of said faces, a ridge at one side of said first-mentioned face, said first-mentioned face having at its opposite side a recess complemental to said ridge, said ridge and recess being adapted to engage a complemental recess and ridge on said second connector to maintain the faces against relative lateral displacement, and means maintaining said faces against relative vertical displacement.

6. An automatic connector as defined by claim 5, wherein the ridge and recess are formed by surfaces joining the face with the respective wings.

7. An automatic connector as defined by claim 5, wherein said means for maintaining said surfaces against relative vertical displacement comprises an arm projecting downwardly and forwardly from the connector face and extending laterally on the opposite side of the connector center line from that on which the forwardly projecting wing extends.

WILHELM KAISER.
HANS BALKE.